(12) United States Patent
Moon et al.

(10) Patent No.: US 12,207,759 B2
(45) Date of Patent: Jan. 28, 2025

(54) OVEN WITH MULTIPLE HEAT SOURCES

(71) Applicant: NuWave, LLC, Vernon Hills, IL (US)

(72) Inventors: Jung S. Moon, Long Grove, IL (US); Byung Gab Choi, Lake Villa, IL (US); Luo Fei, Foshan (CN); Zeng Qing Ping, Shanwei (CN); Kim Jong Rok, Seoul (KR); Eubene Sin, Chicago, IL (US)

(73) Assignee: NuWave LLC, Vernon Hills, IL (US)

( * ) Notice: Subject to any disclaimer, the term of this patent is extended or adjusted under 35 U.S.C. 154(b) by 69 days.

(21) Appl. No.: 17/653,603

(22) Filed: Mar. 4, 2022

(65) Prior Publication Data

US 2023/0276985 A1    Sep. 7, 2023

(51) Int. Cl.
 A47J 37/06   (2006.01)
 A47J 36/32   (2006.01)

(52) U.S. Cl.
 CPC ........... *A47J 37/0641* (2013.01); *A47J 36/32* (2013.01); *A47J 37/0664* (2013.01); *A47J 37/0629* (2013.01)

(58) Field of Classification Search
 CPC . A47J 37/0623; A47J 37/0629; A47J 37/0641
 USPC .................................................. 99/331, 389
 See application file for complete search history.

(56) References Cited

U.S. PATENT DOCUMENTS

| | | | |
|---|---|---|---|
| 11,873,997 B2 * | 1/2024 | Johnson | F24C 7/087 |
| 2003/0034342 A1 * | 2/2003 | Stockley | A47J 37/0641 |
| | | | 219/486 |
| 2016/0029829 A1 * | 2/2016 | Klein | A47J 37/08 |
| | | | 99/332 |
| 2022/0030666 A1 * | 1/2022 | Kramer | A47J 37/0641 |
| 2023/0200586 A1 * | 6/2023 | Tynes | A47J 37/0641 |
| | | | 219/400 |

* cited by examiner

*Primary Examiner* — Reginald Alexander
(74) *Attorney, Agent, or Firm* — Bishop Diehl & Lee, Ltd.

(57) ABSTRACT

A countertop cooking appliance having a housing defining a cooking chamber, a user interface, three heating sources within the cooking chamber, each separately controllable by a controller which distributes power to each heating source as percentages $X_1$, $X_2$, and $X_3$, respectively, and $X_1+X_2+X_3 \leq 100\%$. The countertop cooking appliance may also include multiple fans for circulating heated air within the chamber. Preferably, a first fan is positioned proximate the first heating source so as to circulate heat generated by the first heating source, a second fan is positioned proximate the second heating source so as to circulate heat generated by the second heating source, and a third fan is positioned proximate the third heating source so as to circulate heat generated by the third heating source. The fans may also be independently operated by the controller.

9 Claims, 19 Drawing Sheets

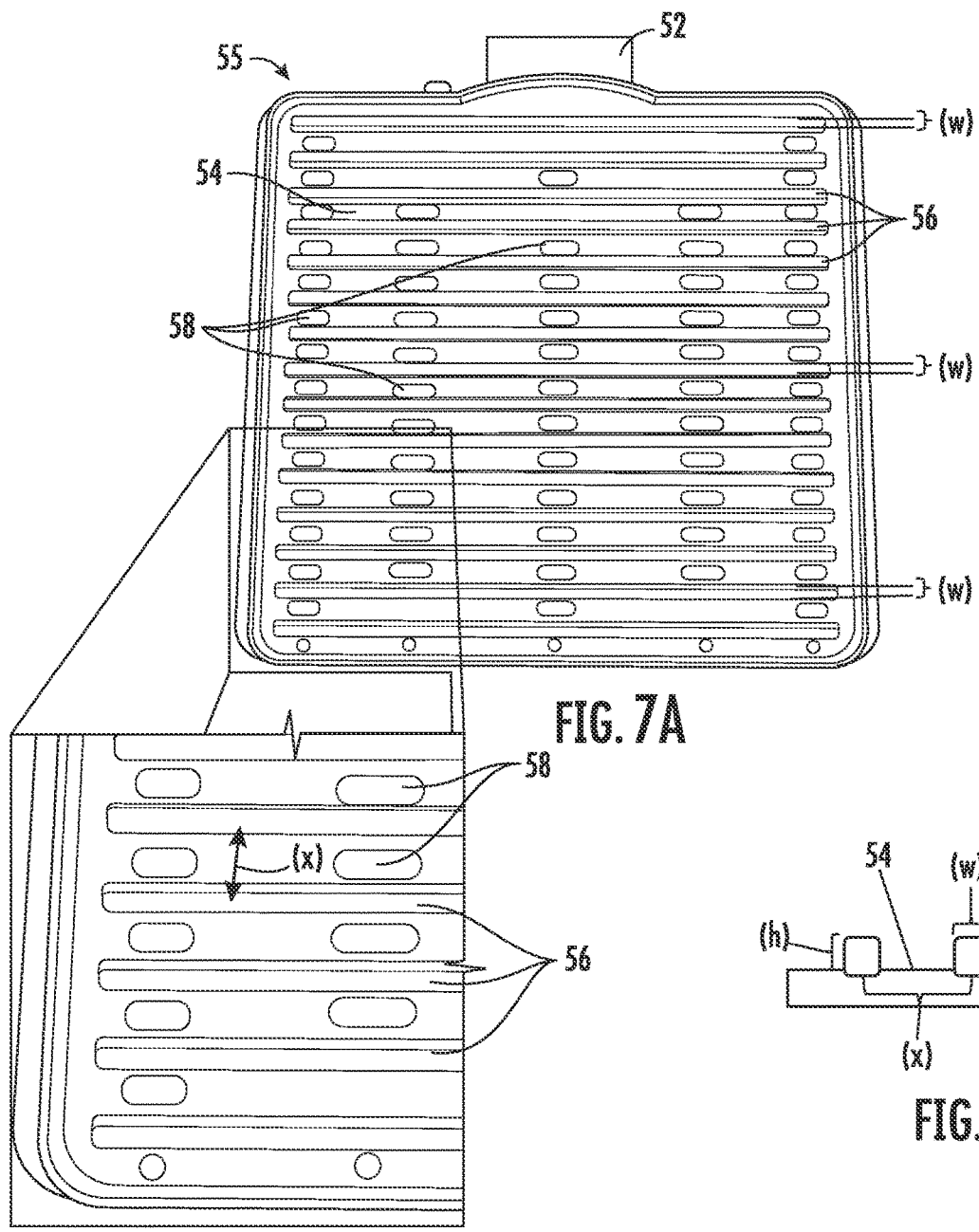
FIG. 7A
FIG. 7B
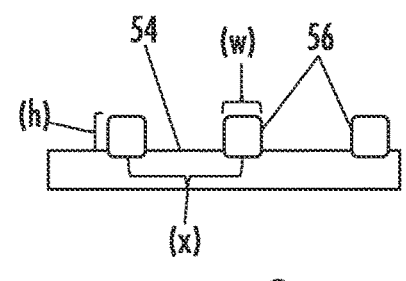
FIG. 8

(CONT.D)

(CONT.D)

| Time (mm:ss) | PRIOR ART GRILL | | | | PRESENT GRILL | | | |
|---|---|---|---|---|---|---|---|---|
| | Left | Center | Right | Inside | Left | Center | Inside | |
| 00:00 | 71.60 | 71.60 | 71.60 | 70.88 | 71.96 | 73.04 | 71.06 | |
| 01:00 | 130.10 | 120.20 | 112.64 | 169.70 | 178.34 | 191.30 | 134.06 | |
| 02:00 | 189.32 | 171.50 | 160.16 | 246.38 | 255.20 | 274.64 | 197.96 | |
| 03:00 | 256.82 | 211.64 | 206.24 | 299.48 | 334.40 | 358.16 | 264.74 | |
| 04:00 | 310.82 | 261.86 | 298.40 | 347.00 | 402.80 | 427.64 | 326.66 | |
| 05:00 | 340.70 | 353.12 | 337.64 | 379.04 | 442.04 | 464.90 | 372.20 | |
| 06:00 | 370.22 | 377.60 | 359.60 | 400.28 | 471.56 | 493.34 | 409.46 | |
| 07:00 | 401.54 | 395.42 | 385.52 | 409.46 | 499.28 | 519.98 | 436.10 | |
| 08:00 | 415.04 | 413.24 | 403.88 | 417.74 | 522.50 | 543.74 | 457.70 | |
| 08:10 | 413.42 | 413.42 | 404.78 | 413.60 | 525.92 | 546.80 | 461.12 | |
| 08:20 | 418.64 | 418.28 | 410.36 | 419.18 | 529.52 | 550.58 | 462.92 | (A) |
| 08:30 | 426.02 | 424.76 | 417.38 | 430.52 | 431.78 | 447.80 | 364.46 | |
| 08:40 | 435.56 | 431.78 | 424.76 | 440.06 | 387.50 | 377.96 | 397.22 | |
| 08:50 | 417.02 | 402.80 | 382.46 | 382.46 | 369.50 | 364.64 | 416.66 | (B) |
| 09:00 | 111.38 | 131.36 | 109.22 | 375.80 | 357.08 | 356.54 | 417.20 | |
| 09:30 | 127.58 | 129.74 | 123.62 | 410.00 | 348.26 | 342.68 | 414.86 | |
| 10:00 | 134.42 | 141.26 | 126.50 | 431.60 | 345.02 | 350.60 | 414.32 | |
| 10:30 | 154.40 | 161.24 | 132.44 | 448.34 | 352.04 | 357.62 | 413.42 | |
| 11:00 | 158.18 | 204.26 | 159.80 | 442.22 | 348.62 | 361.94 | 414.50 | |
| 11:30 | 175.46 | 226.22 | 182.30 | 436.82 | 353.84 | 364.46 | 413.24 | |
| 12:00 | 204.62 | 255.02 | 205.88 | 452.48 | 369.14 | 368.60 | 412.52 | |
| 12:30 | 223.16 | 296.60 | 210.92 | 457.88 | 368.60 | 371.48 | 409.46 | |
| 13:00 | 228.38 | 310.46 | 218.30 | 444.92 | 381.38 | 374.36 | 406.94 | |
| 13:30 | 229.46 | 299.48 | 229.64 | 450.14 | 388.22 | 375.26 | 404.60 | |
| 14:00 | 235.04 | 292.10 | 228.92 | 457.52 | 392.72 | 385.88 | 402.80 | |
| 14:10 | 233.24 | 297.14 | 230.72 | 455.72 | 387.14 | 386.42 | 401.90 | |
| 14:20 | 237.02 | 297.14 | 228.02 | 451.76 | 386.06 | 340.70 | 344.84 | (C) |
| 14:30 | 233.60 | 299.48 | 235.76 | 456.44 | 300.02 | 288.50 | 356.00 | |
| 14:40 | 231.62 | 298.40 | 239.00 | 446.90 | 293.54 | 300.74 | 386.78 | |
| 14:50 | 234.68 | 298.58 | 238.64 | 445.10 | 279.68 | 310.64 | 392.90 | |
| 15:00 | 235.22 | 300.74 | 241.52 | 449.06 | 269.42 | 308.66 | 393.44 | |
| 15:10 | 233.24 | 299.12 | 239.72 | 371.12 | 255.74 | 315.14 | 393.80 | (D) |
| 15:30 | 216.68 | 246.74 | 352.94 | 413.96 | 253.58 | 336.56 | 394.70 | |
| 16:00 | 235.94 | 249.80 | 365.90 | 415.22 | 251.60 | 347.36 | 394.88 | |
| 16:30 | 237.02 | 252.86 | 389.48 | 440.42 | 269.06 | 354.20 | 396.14 | |
| 17:00 | 241.34 | 258.08 | 396.68 | 450.86 | 277.16 | 370.94 | 397.40 | |
| 17:30 | 244.40 | 257.90 | 387.68 | 444.02 | 284.72 | 380.30 | 398.30 | |
| 17:40 | 244.76 | 257.36 | 388.94 | 444.56 | 282.56 | 376.52 | 398.84 | (E) |
| 18:00 | 245.84 | 259.70 | 389.30 | 448.70 | 276.26 | 364.46 | 399.38 | |
| 18:30 | 244.76 | 260.24 | 390.20 | 454.82 | 276.62 | 370.40 | 399.74 | |
| 19:00 | 243.50 | 258.26 | 380.30 | 453.02 | 264.20 | 360.86 | 399.38 | |
| 19:10 | 243.14 | 253.04 | 375.98 | 446.00 | 263.48 | 356.36 | 401.54 | (F) |

FIG. 19

OVEN WITH MULTIPLE HEAT SOURCES

TECHNICAL FIELD OF THE INVENTION

The present invention relates to a programmable countertop cooking oven. More specifically, the invention relates to such an oven having multiple heat sources for cooking.

BACKGROUND OF THE INVENTION

Electric cookers or ovens, commonly referred to as counter-top cookers, are well-known in the art. In comparison to a conventional oven, the counter-top cooker offers the advantage of being less bulky and, in many cases, having quicker cooking times. Typically, the counter-top cookers include a power head having an electric heating unit that generates heat in a cooking enclosure. To reduce the cooking time, counter-top cookers typically rely on circulation of a hot air stream that is produced by a high-speed fan provided in the power head upstream of a single electric heating element. Alternatively, an infrared heating element in combination with a relatively low-speed fan can be used to generate heated air circulation in an oven sufficient to cook food. In either case, the heated air is produced from above a cooking surface within the cooking enclosure.

In some types of cooking such as roasting or broiling, it is desirable to expose all sides of a food item to direct radiant heat to obtain even cooking and color. To achieve this result, it has been necessary in the known counter-top cookers to rotate food items periodically or continually. so that all surfaces of the food are directly exposed to the radiant heat from the single heating element in the power head at the top of the cooker. If done manually, this can create an issue by constantly opening the cooking enclosure to turn food items. If done automatically through use of a mechanical system to continually rotate food, problems may arise due to wear and failure of mechanical parts, as well as creating a significant increase in manufacturing cost.

Also, while the known counter-top cookers do cook food faster than conventional ovens, the cooking time is still considered by some to be long enough that it does not create an incentive to purchase counter-top cookers. Use of direct heat to cook food items could significantly reduce cooking times to create an incentive for greater use of counter-top cookers.

Until the present inventive countertop oven, these and other problems in the prior art went unsolved by those skilled in the art. The inventive countertop oven and control app provide a unique and highly-efficient cooking system with numerous advantages in operation and effectiveness without sacrificing convenience, flavor, design or versatility.

SUMMARY OF THE INVENTION

There is disclosed herein an improved countertop cooking appliance and a mobile device control application which avoid the disadvantages of prior devices and applications while affording additional structural and operating advantages.

Generally speaking, the countertop cooking appliance comprises a housing defining a cooking chamber, a user interface, three heating sources within the cooking chamber, each separately controllable by a controller which distributes power to each heating source as percentages $X_1$, $X_2$, and $X_3$, respectively, and $X_1+X_2+X_3 \leq 100\%$.

In specific embodiments, the countertop cooking appliance further comprises multiple fans for circulating heated air within the cooking chamber. Preferably, a first fan is positioned proximate the first heating source so as to circulate heat generated by the first heating source within the cooking chamber, a second fan is positioned proximate the second heating source so as to circulate heat generated by the second heating source within the cooking chamber, and a third fan is positioned proximate the third heating source so as to circulate heat generated by the third heating source within the cooking chamber. The fans may also be independently operated by the controller.

In other specific embodiments, the countertop cooking appliance further comprises a removable grill plate which deactivates the second and third heating sources when connected. The controller distributes power to the grill plate and the power distributed to the grill plate during use is $X_4$, and $X_4$ is a percentage wherein, $X_1+X_4 \leq 100\%$.

Regarding the control application for a mobile device, the method generally comprises storing instructions in the memory, executing the stored instructions by the at least one processor such that the mobile device performs operations comprising:
  displaying a graphical interface having a plurality of icons, wherein each of the plurality of icons corresponds to one of either a preset operation or a control feature of the cooking appliance;
  linking the graphical interface to the cooking appliance through the wireless network;
  naming and storing the cooking appliance to the memory;
  navigating the graphical interface in response to a user selecting one of the plurality of icons;
  inputting, by a user, a single set of appropriate operating parameters for the named and stored cooking appliance based on the icon selected by a user; and
  sending the inputted single set of operating parameters to the cooking appliance via the wireless network to thereby control the cooking appliance.

In specific embodiments of the control app, the method further comprises attaching the grill plate within the cooking chamber, which then deactivates the second and third heating sources.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated

FIG. 7A is a top view of an embodiment of an insertable grill plate;

FIG. 7B is a close-up view of a portion of the grill plate of FIG. 6A;

FIG. 8 is a schematic of a cut-away section of an embodiment of a grill plate to illustrate relative dimensions;

FIG. 19 is a table showing side-by-side temperature data from FIGS. 10 and 11.

DETAILED DESCRIPTION OF THE INVENTION

Figure 1:
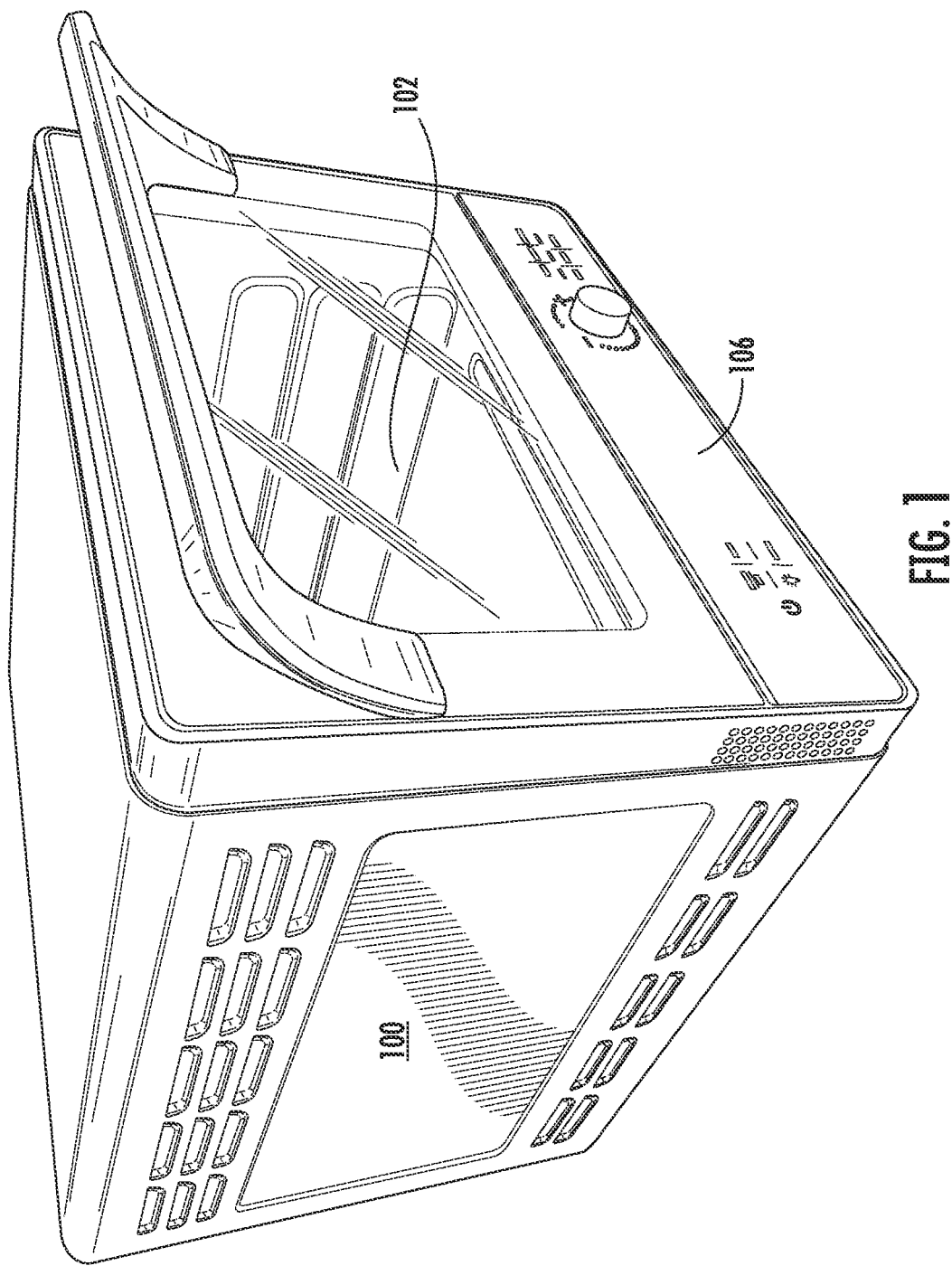
FIG. 1 is a perspective view of a prior art countertop convection oven.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Figure 2:
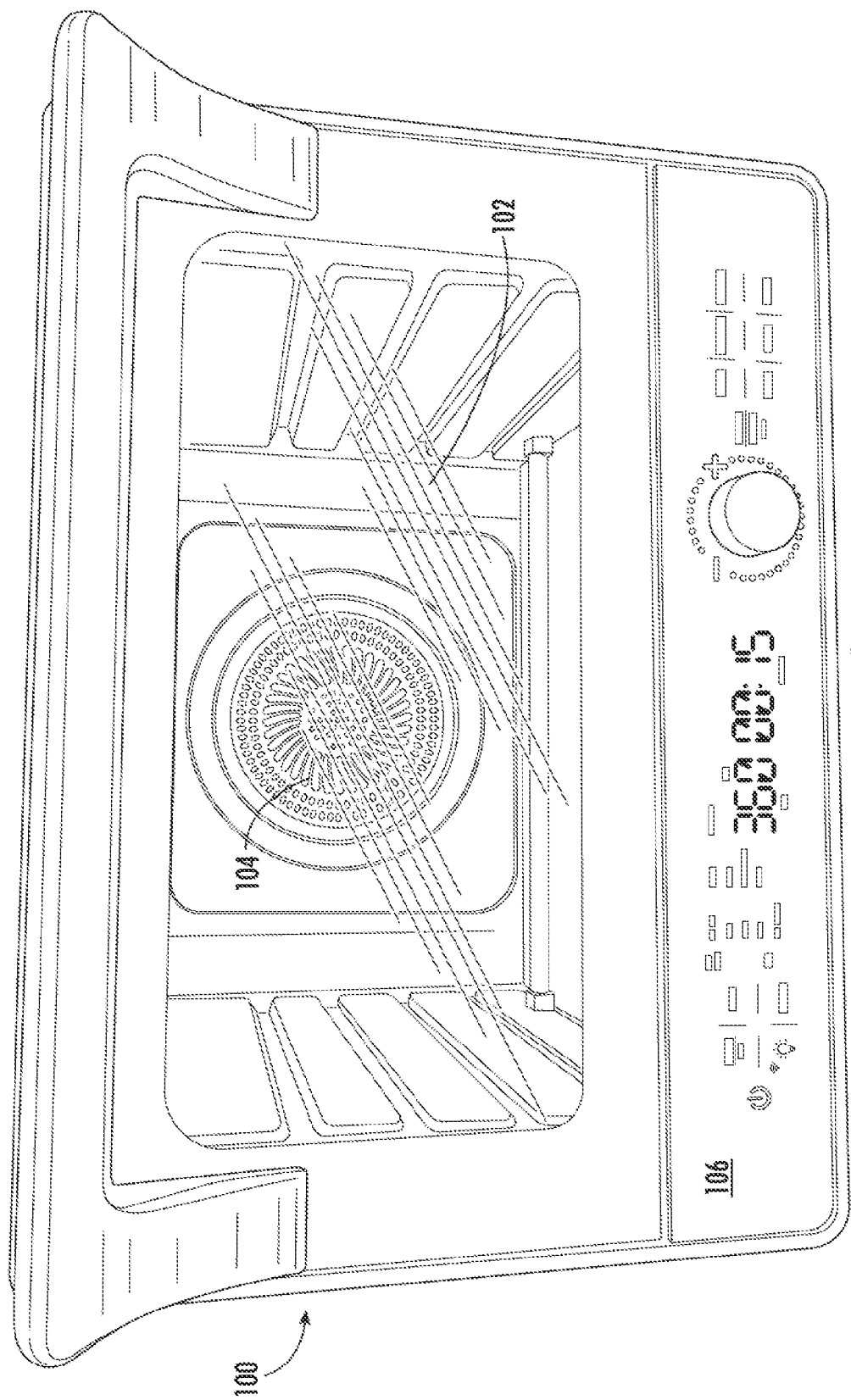
FIG. 2 is a front view of the prior art countertop convection oven shown in FIG. 1.

Referring to FIGS. 1 and 2, a standard prior art convection oven appliance 100 is shown. This appliance 100 is designed to be placed on a countertop and plugged into a power outlet. A built-in heat source is used to heat air within an interior cooking chamber 102 while a fan 104 circulates the heated air. A control panel 106 on the exterior of the appliance 100 allows a user to manually set cooking temperatures, cooking time, fan speed, and other cooking parameters. The control panel 106 may even provide pre-set cooking selections, such as "sear," "reheat," "defrost," and the like.

Figure 3:
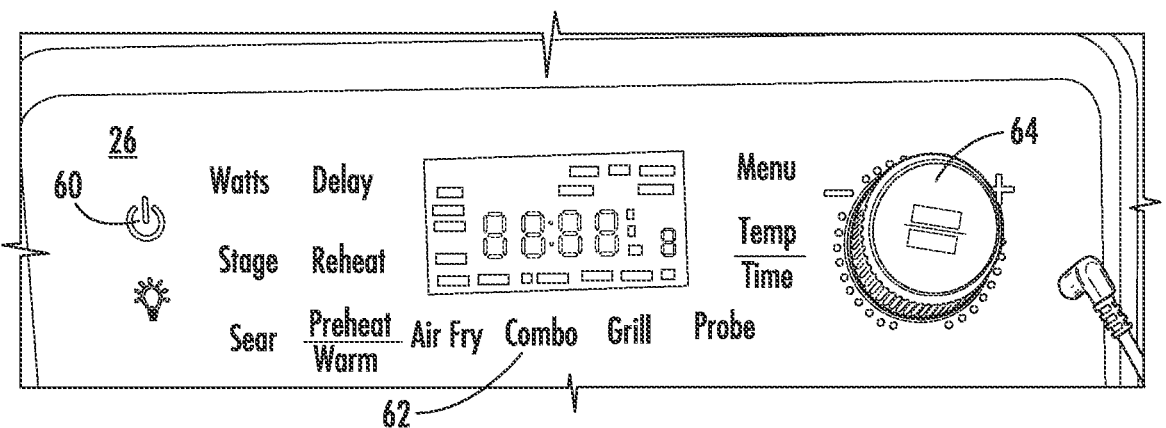
FIG. 3 is a close-up view of an embodiment of a user interface control panel for the disclosed countertop convection oven.
Figure 4:
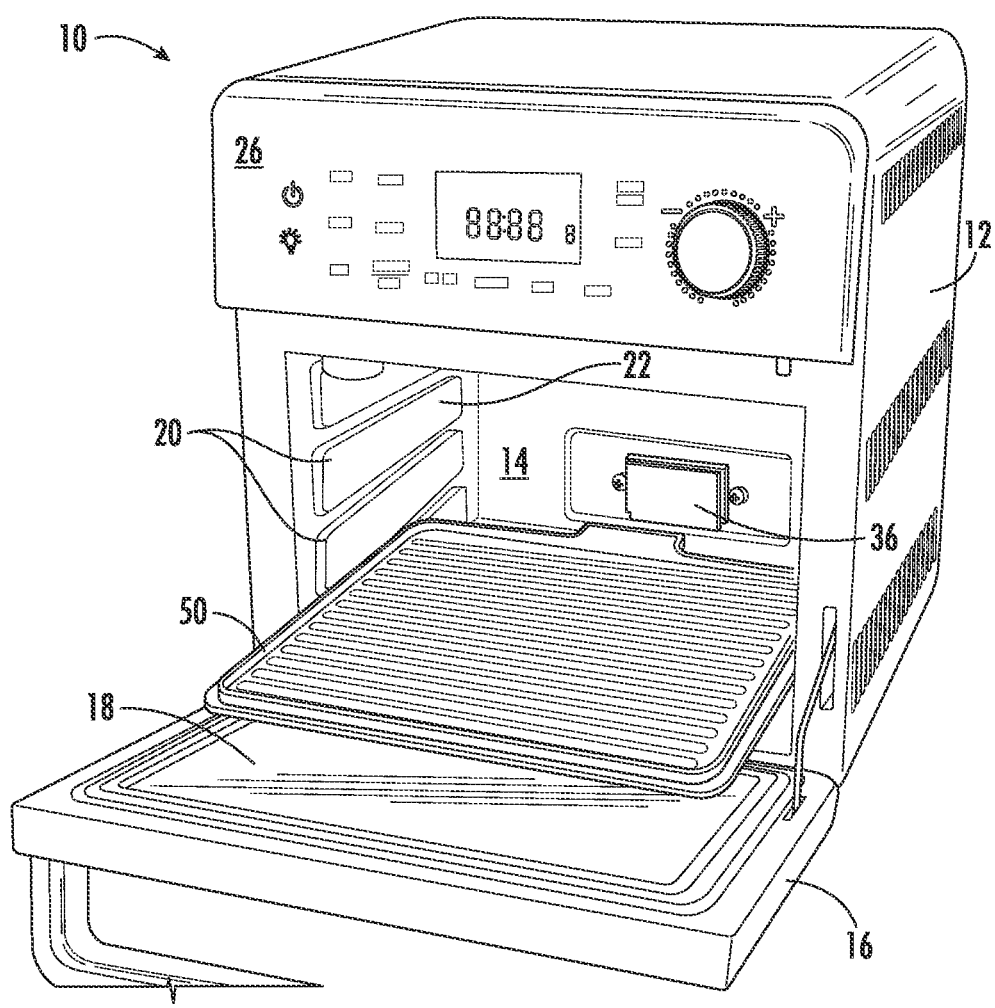
FIG. 4 is a front perspective view of another embodiment of a countertop convection oven with an insertable grill plate as described herein.
Figure 5:
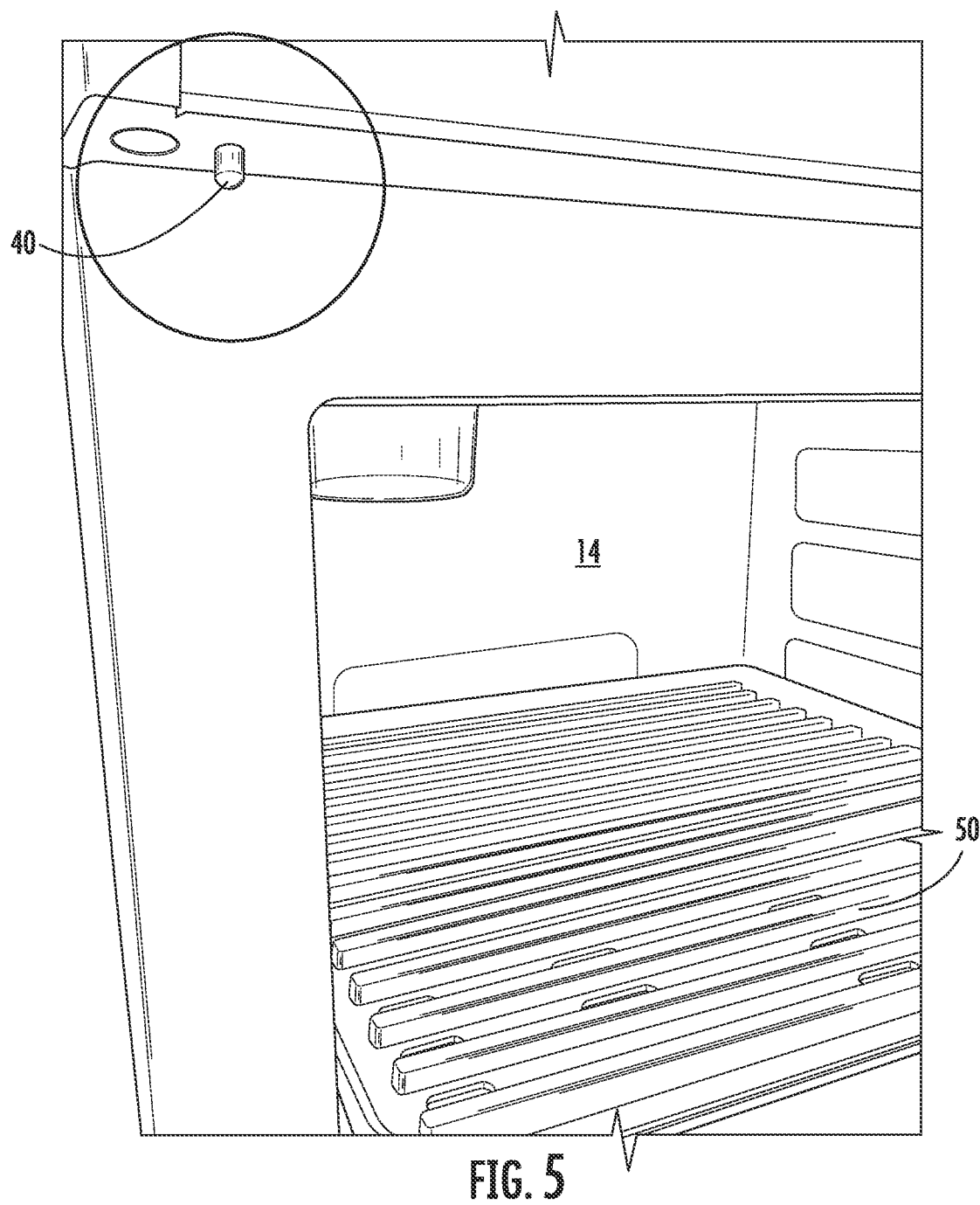
FIG. 5 is a close-up view of an embodiment of the door sensor for the disclosed countertop convection oven.

Embodiments of the present invention are illustrated in FIGS. 3-5, where the cooking appliance is generally designated by the numeral 10. The particular illustrated cooking appliance 10 is of a countertop convection oven with a removable grill plate 50

As can be seen in FIGS. 3-6, the cooking appliance 10 includes a housing 12 with a defined cooking chamber 14. A front opening of the chamber 14 is covered by a downward pivoting door 16, preferably with a glass window 18. A plurality of tray/rack supports 20 may be provided along sidewalls 22 of the chamber 14 to allow the insertion and removal of cooking trays, wire racks 24, and a removable grill plate 50 (see FIG. 4). A control panel 26 is positioned on a front face of the appliance 10, either above or below the door 16.

The preferred cooking appliance 10 includes three heating sources 30. A first heating source 30A is positioned at the top surface of the cooking chamber 14 within the housing 12, while a second heating source 30B is positioned at the bottom surface of the cooking chamber 14 within housing 12. A third heating source 30C is positioned at a rear wall of the cooking chamber 14 within housing 12 and includes a fan 32 for circulating the heated air within the cooking chamber 14. Additional fans may be provided. The positioning of the three heating sources 30 has been found to provide the most advantageous cooking. However, other locations for any one or all of the heating sources 30 may be possible. Additional heating sources may also be used, as necessary. Each of the heating sources 30A-C and the fan 32 are electrically connected to the power source—via standard wiring and use of, for example, AC plug 34—to facilitate powering of these components.

FIG. 3 illustrates a user interface control panel 26 provided on an outward front-face surface of the cooking appliance 10. The control panel 26 provides control of each of the heating sources 30, including the grill plate 50 when inserted. In a preferred embodiment, the bottom heating source 30B and rear heating source 30C are each deactivated when the grill plate 50 is inserted into the cooking chamber 14 and connected to the power source outlet 36. The control panel 26 allows a user to enter time, temperature, cooking power, etc. as just some of the possible control inputs.

Grill Plate Attached

Figure 6:
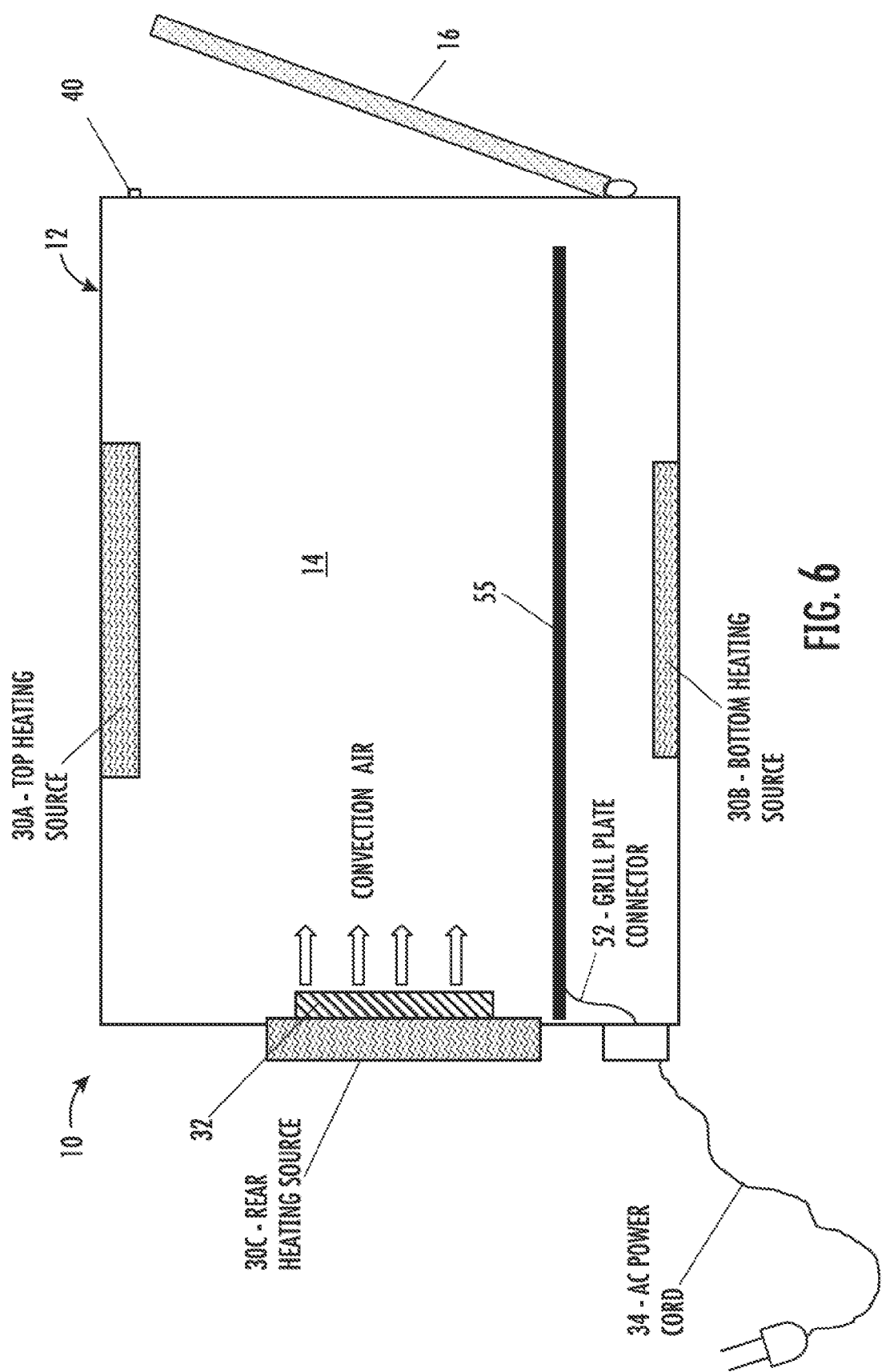
FIG. 6 is a schematic illustrating an embodiment of a countertop convection oven with insertable grill plate as described herein.
Figure 9:
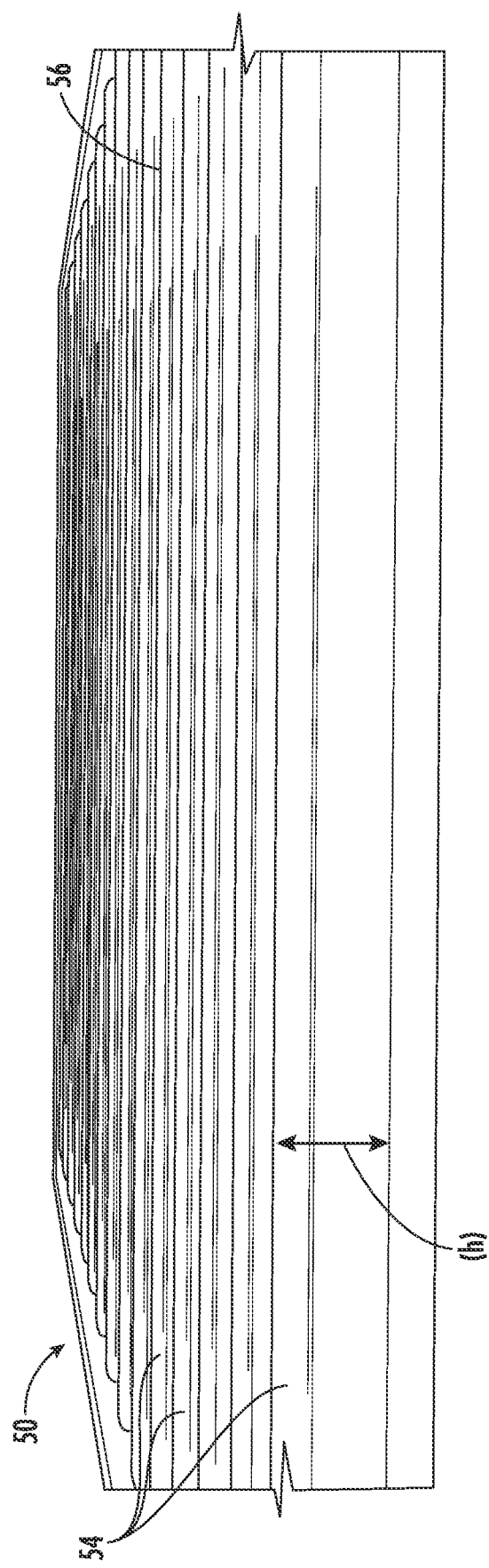
FIG. 9 is front edge view of the grill plate shown in FIG. 6A.

FIGS. 4-6 show a grill plate 50 positioned in a bottom slot of the cooking appliance 10. The grill plate 50 provides an alternative direct heat source to the cooking appliance 10 for combination cooking techniques. Combination cooking, aka "combo cooking," allows a user to cook food using direct bottom heat from the grill plate 50 combined with top convection heat from the first heat source 30A. The user can adjust power to the grill plate 50 and the top heating source 30A, preferably in 5% increments, for 100% total power—e.g., 65% power to grill plate 50 and 35% power to heating source 30A.

The "Combo" cooking feature is only available when the grill plate 50 is connected to the outlet 36 (FIG. 4). In order to engage the grill plate 50, the user must press the [on/off] button 60 and then the [Combo] button 62. A 70% power to the grill plate 50 and 30% power to the top heating source 30A is a preferable default setting. However, the power percentages can be adjusted by turning the dial 64. To the right [+] increases power to the top heating source 30A up to 100%, while left [−] increases power to the grill plate 50 up to 100%.

Figure 14:
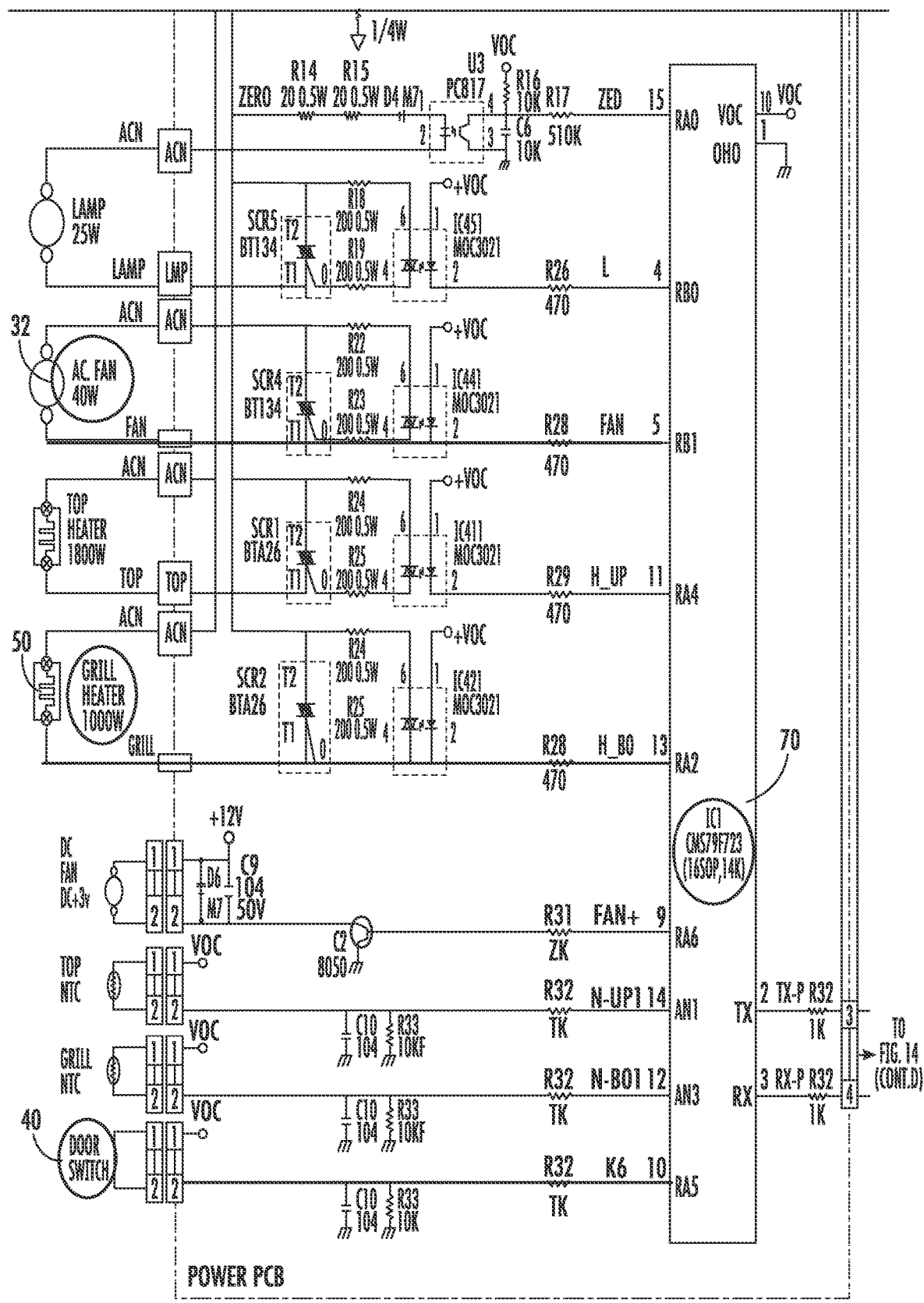
FIG. 14 is an electronic schematic of an embodiment of the disclosed cooking appliance illustrating operation when the door switch mechanism is activated.
Figure 14:
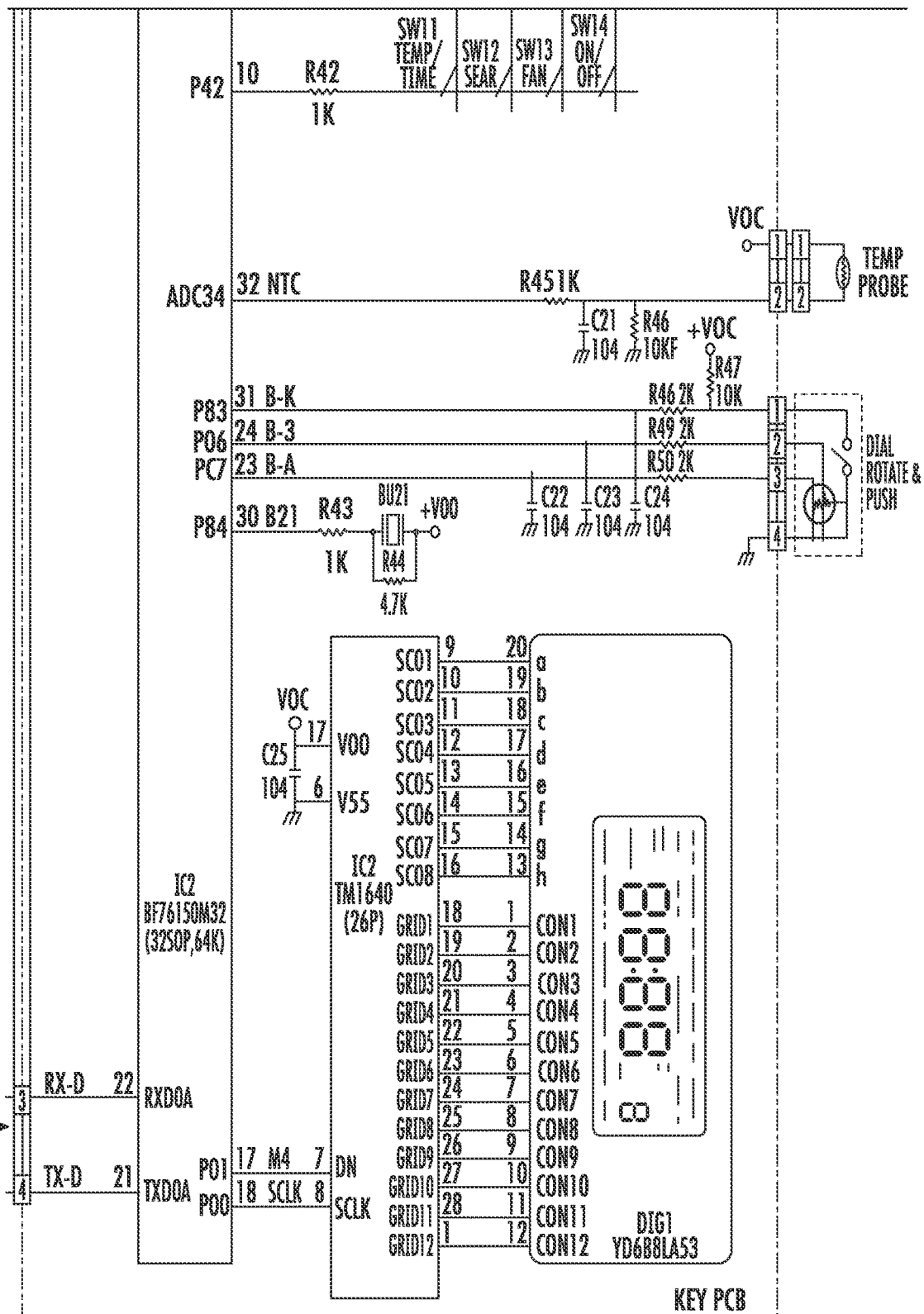
Figure 15:
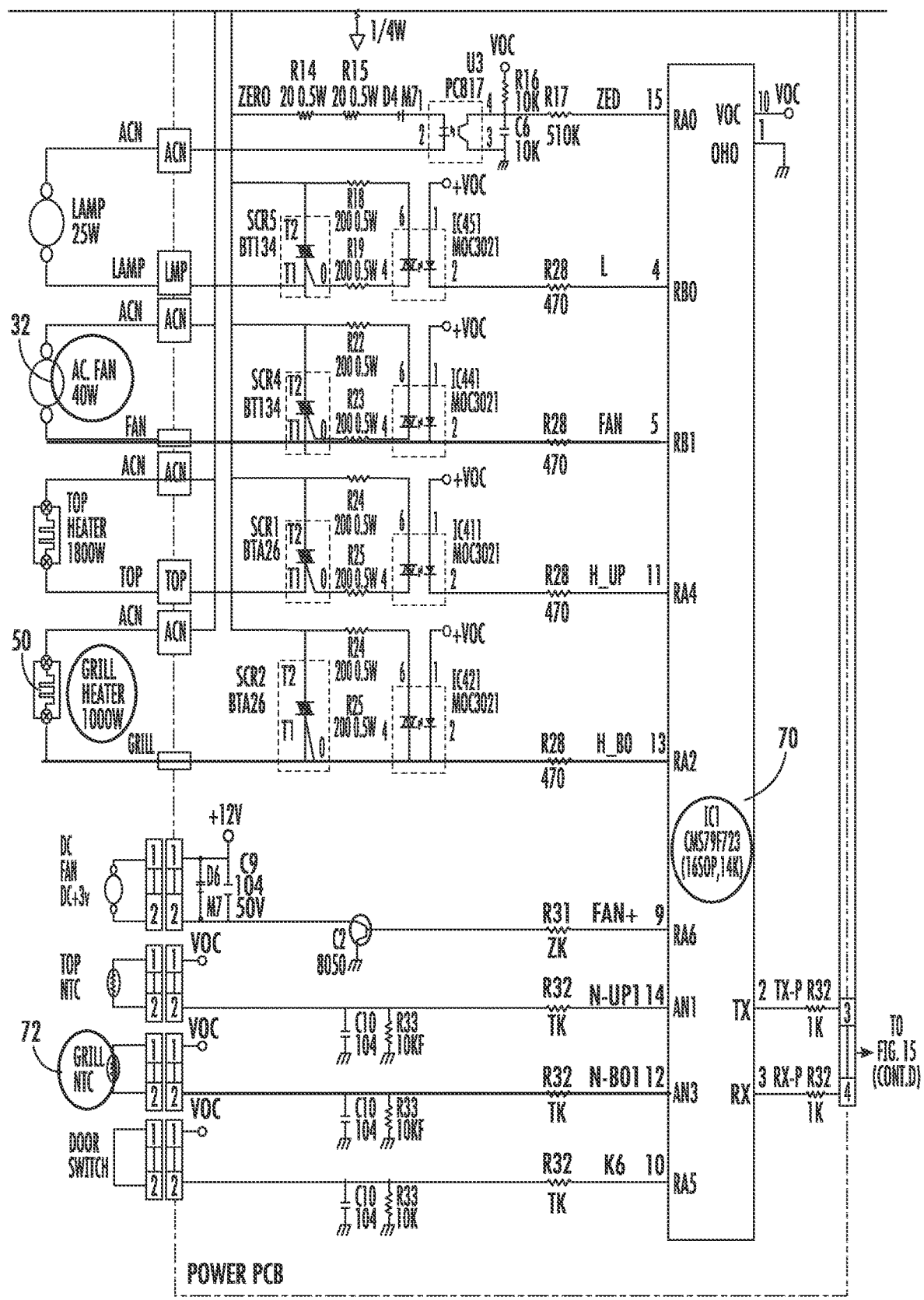
FIG. 15 is an electronic schematic of an embodiment of the disclosed cooking appliance illustrating operation when a temperature drop is detected.
Figure 15:
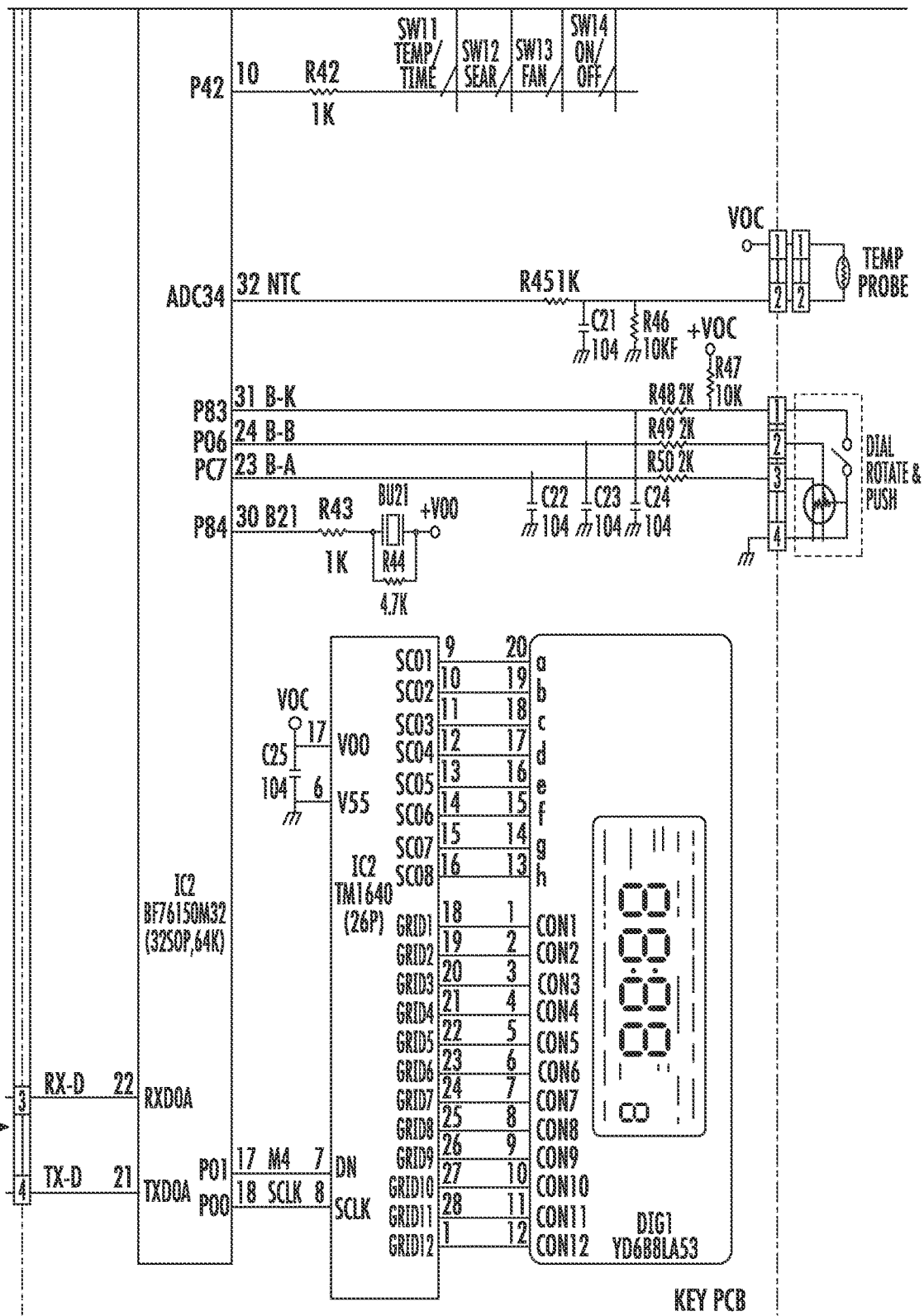

As shown in FIG. 5, one of the key features of the disclosed cooking appliance 10 and grill plate 50 combination includes a door switch 40. When the pivoting door 16 is in an open position—even partially open—the switch 40 signals a controller (not shown) to increase power to the grill plate 50 and the first or top heating source 30A. The increase in power results in an increase in temperature at the grill plate 50, which is intended to overcome the loss of heat due to the open door and/or the placement of a much cooler food item, e.g., steak, chicken, pork. FIGS. 14 and 15 show schematically the components which are used to trigger the power increase as a result of a door open (FIG. 14) or temperature drop (FIG. 15) condition.

Preferably, a 100° F. increase for less than five minutes, most preferably approximately two minutes (+10 seconds), is sufficient to overcome the heat loss. This power/heat boost is a particularly useful feature for grilling, as it is necessary to open the appliance door 16 to add and turn over food items, such as burgers, steaks, chicken, and the like. Maintaining the grill temperature ensures a proper searing temperature, which is critical to locking in natural food juices during grilling. While a 100° F. increase for two minutes is preferred, certainly increases of less or more heat for longer or shorter periods may be suitable for other applications. Data in support of this feature, as compared to a prior art system, is shown in TABLE 1 below.

Referring to FIGS. 7A, 7B, 8 and 9, the grill plate 50 can be more readily understood. As previously stated, the grill plate 50 provides a direct heating source for food when place onto the connected grill plate 50. In a preferred embodiment, a connector 52 on a back edge of the grill plate 50 connects to a corresponding outlet connector 36 within the cooking chamber 14 and allows the grill plate 50 to receive power from the power source.

In a preferred embodiment, the grill plate 50 includes a top surface 54 having a plurality of raised ribs 56—i.e., metal or ceramic ribs, as opposed to pork or beef ribs. The ribs 56 have specific dimensions which facilitate maintaining a consistent temperature during grilling. First, the ribs 56 are equidistantly spaced a distance (x) on the grill plate 50, approximately 10.2 mm to 13.8 mm, measured center to center. Most preferably, the distance is approximately 12 mm, center to center. Further, the thickness or width (w) of each rib 56 is approximately the same as the height (h) of the rib 56. The width (w) and height (h) of each rib should fall within the range of 5 mm to 8 mm. The range for the height (h) is preferably 5.5 mm to 8 mm, with a most preferred height (h) of 6.5 mm. Similarly, the width (w) has a preferred measure in the range of 5 mm to 7 mm, with 6 mm being the most preferred width (w). By "approximately" it is meant that to an observer, without measurement, the dimensions appear equal—i.e., w=h. This near 1:1 relationship combined with the rib spacing has been found to help minimize heat loss of the grilling surface 54, which often happens when food is added directly to the grill plate 50. The loss of heat results in inferior grilling. Significant loss of heat at the grilling surface during grilling can have a significant impact on the quality and taste of grilled food.

The grilling surface also comprises a plurality of holes 58 that release oil and food drippings into a pan below the grill plate 50. Draining away such material helps maintain the grill plate temperature as well. The plurality of holes 58 also result in less surface area to heat, which helps regulate the temperature, unlike prior art devices.

Figure 10:
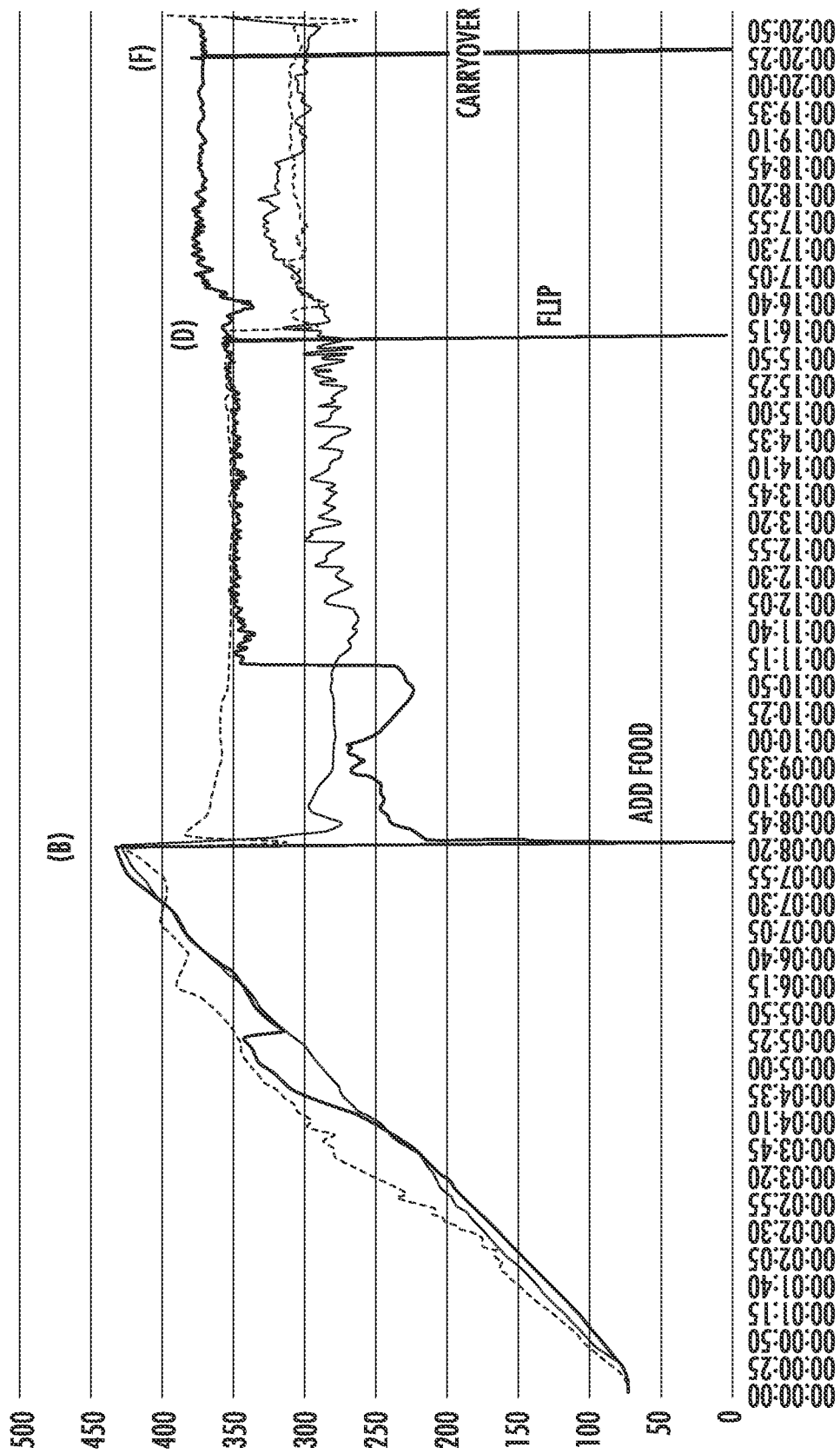
FIG. 10 is a temperature/time graph corresponding to data acquired during grilling using a prior art cooking appliance.
Figure 11:
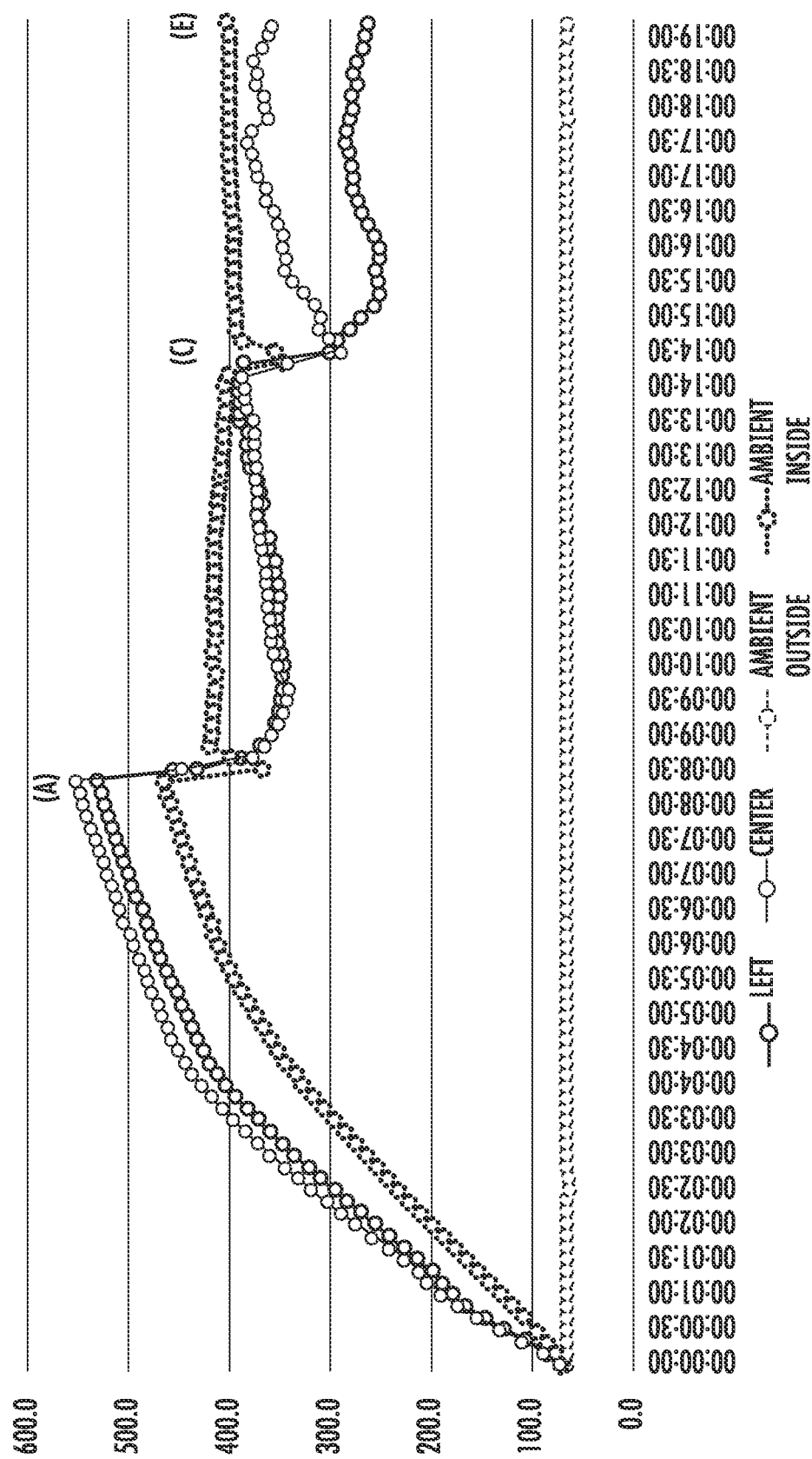
FIG. 11 is a temperature/time graph corresponding to data acquired during grilling using a cooking appliance of the present disclosure.

The table of FIG. 19 shows side-by-side temperature data of a prior art grilling surface (left side of table) and the grilling surface of an embodiment of the present invention (right side of table). The data for the two systems is also provided in graph form, as shown in FIGS. 10 and 11.

To acquire the data provided in FIG. 19, a 16 oz. 1.5-inch steak was to be cooked on each grill-ambient outside temperature of 67° F. (+1.0° F.). The present invention completed preheat at row A (8:20), while the prior art grill completed preheat at row B (8:50). The steaks were turned at internal temperatures of 75° F., as shown by row C (14:20) and row D (15:10), for the present invention and prior art systems, respectively. Grilling was completed at row E (17:40) and row F (19:10). Each of the critical points A-F are indicated on the graphs of FIGS. 10 and 11 as well.

The temperature data of FIG. 19 shows that the prior art grill reached a temperature (° F.) of 417/402/382 after 8:50 (mm:ss) as measured at the left, center, and right areas of the grill surface, respectively. The temperature immediately dropped to 111/131/109° F. upon addition of the steak. This represents a drop of approximately 305/271/273° F. or roughly an average temperature loss of 70% (73%/67%/71%). Further, the grilling temperature did not return to a proper grilling temperature of approximately 230° F. for at least three and a half minutes (13:00).

Conversely, the present invention reached a temperature of 530/550° F. (left and center) at 8:20 and dropped to 431/447° F. after addition of the steak. The temperature loss of 98/103° F. represents an average of under 19% drop (i.e., 18.5%/18.7%). More importantly, the grill surface returned to a proper grilling temperature of 370/365° F. by the 8:50 mark—i.e., in less than 30 seconds. Finally, grilling of the steak was completed by the present invention at least 90 seconds prior to the prior art system.

Figure 12:
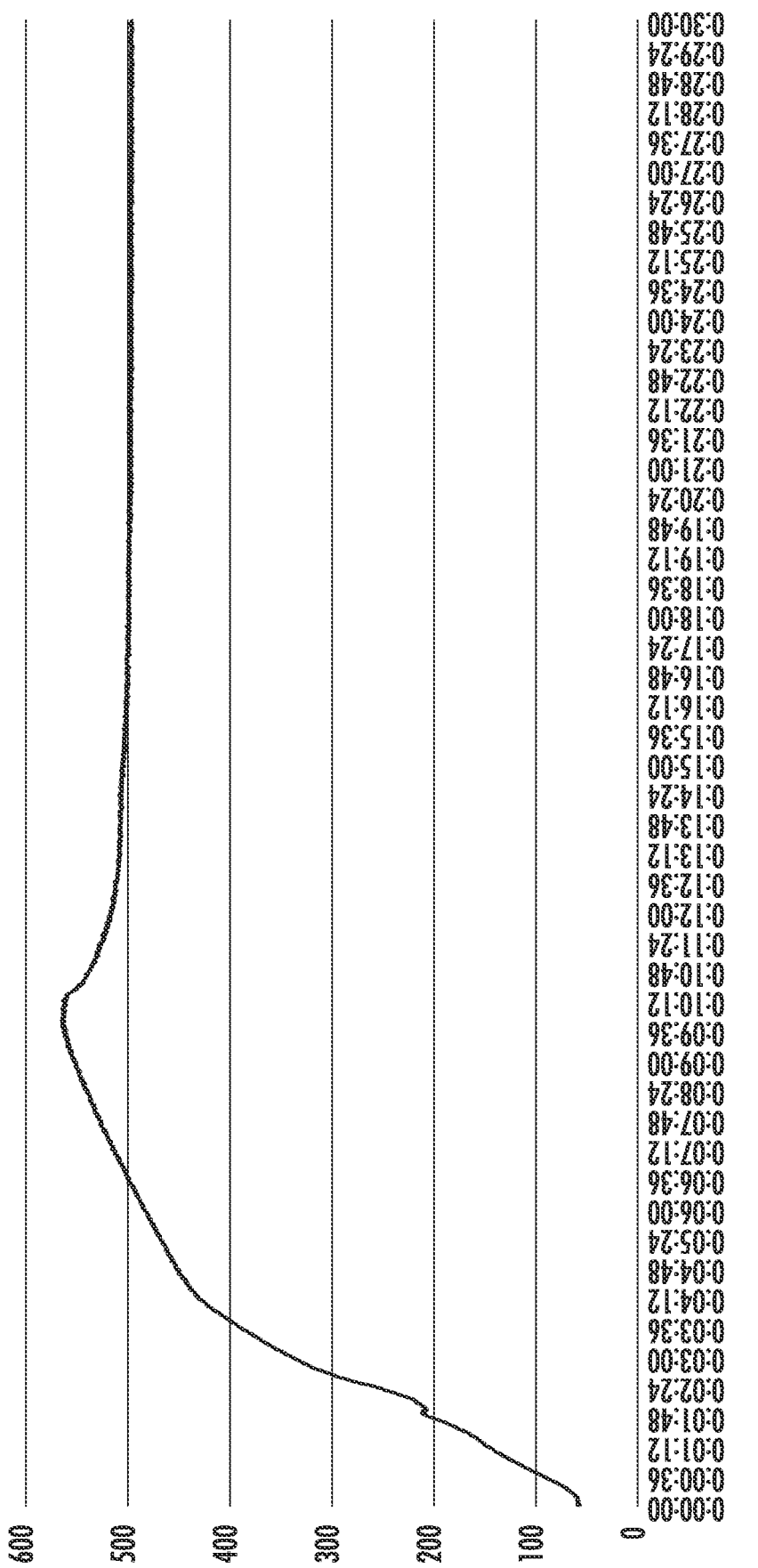
FIG. 12 is a temperature profile of an embodiment of the present disclosure.

During grilling, the present cooking appliance 10 adjusts the power level of the two heating elements together—i.e., grill plate 50 and heating source 30A—in order to maintain the grill plate 50 surface temperature. The result is a steady, even temperature profile as shown in FIG. 12. With reference to FIG. 14, as soon as the door 16 is opened, the door switch 40 activates. This triggers the controller IC 70 to provide full power (1000 W) to the grill plate 50 and fan 32 for approximately two minutes. Likewise, if the temperature sensor for the grill plate 50, preferable an NTC thermistor 72, reacts to a temperature drop (e.g., 10-20° F.), the controller IC 70 is triggered to provide full power (1000 W) to the grill plate 50 and fan 32 for approximately two minutes.

Figure 13:
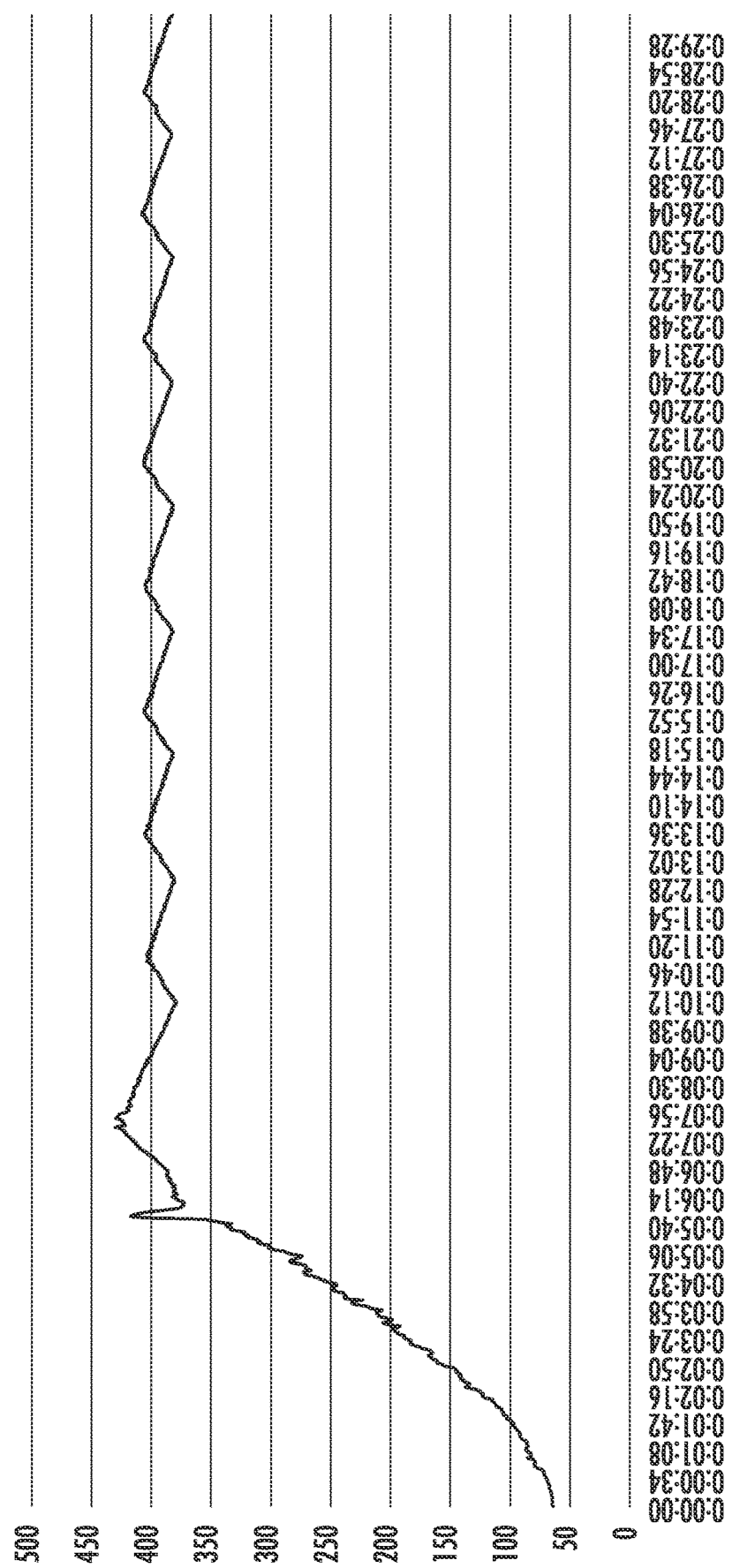
FIG. 13 is a temperature profile for a prior art cooking appliance.

Conversely, prior art devices never use a top and bottom grill heater together. Instead, they work alternately to create a fluctuating grill surface temperature, as shown in FIG. 13.

Grill Plate Removed

Heating in a convection oven has conventionally been accomplished in one of two ways: fixed power and full power. First, heating can be done at a fixed power (i.e., less than 100% power) until the target temperature is achieved, then power is repeatedly switched off and on to maintain the target temperature. Second, heating can be done at full power (i.e., 100% power) until the target temperature is achieved, then turning power off and on as in the first method. The two different prior art heating schemes are illustrated in FIGS. 16 and 17.

Figure 16:
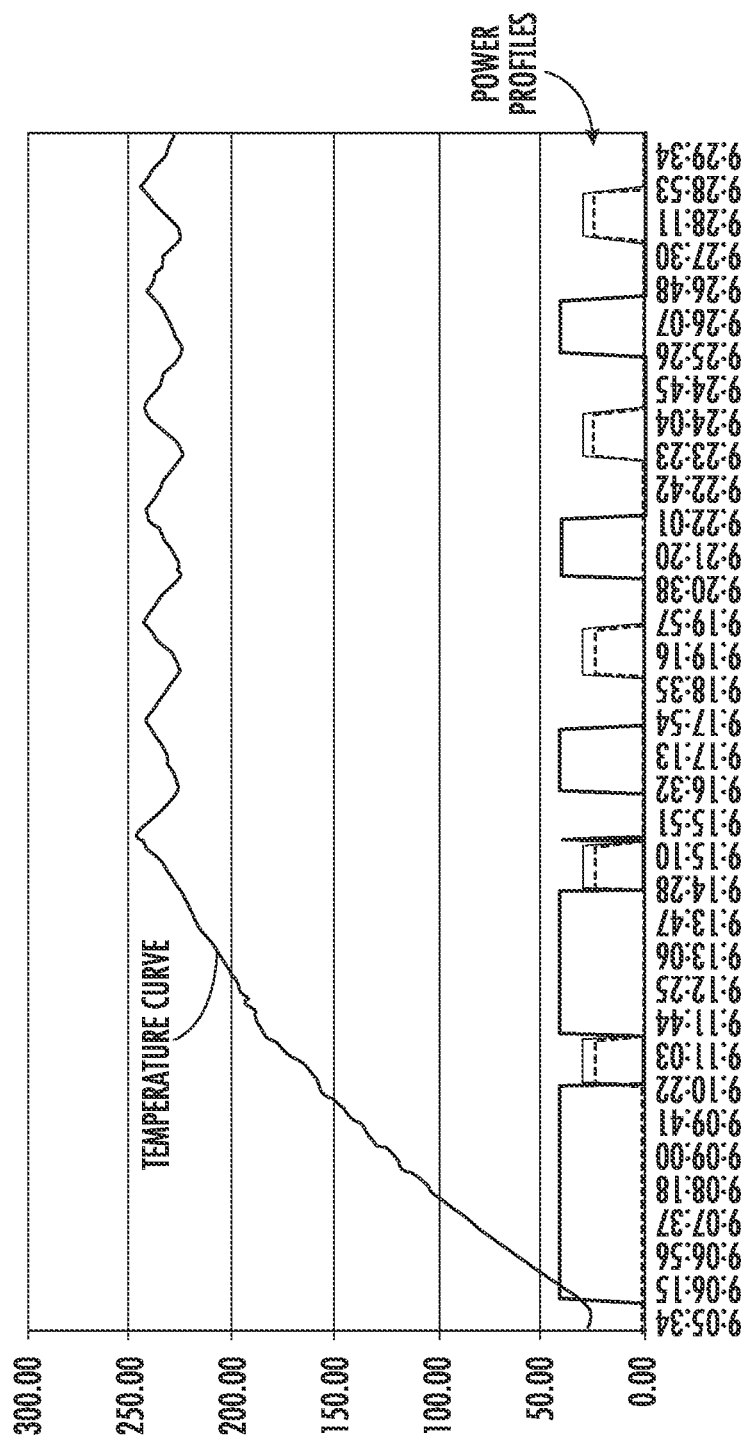
FIG. 16 is a graph showing a temperature curve and representative power usage for a prior art cooking appliance.

As to FIG. 16, heating at a fixed power (e.g., 50% power, 75% power, etc.) until a target temperature (250° F. in this graph) is reached is illustrated by moderate slope of the temperature line. The slow increasing temperature is then followed by 20-25° F. fluctuations as the prior art appliance attempts to maintain the target temperature. The fluctuations are the result of repeatedly turning off all heater power at achievement of the target temperature and allowing the temperature to naturally drop before starting to heat again at the previous fixed power. This is an undesirable temperature profile for a cooking operation.

Figure 17:
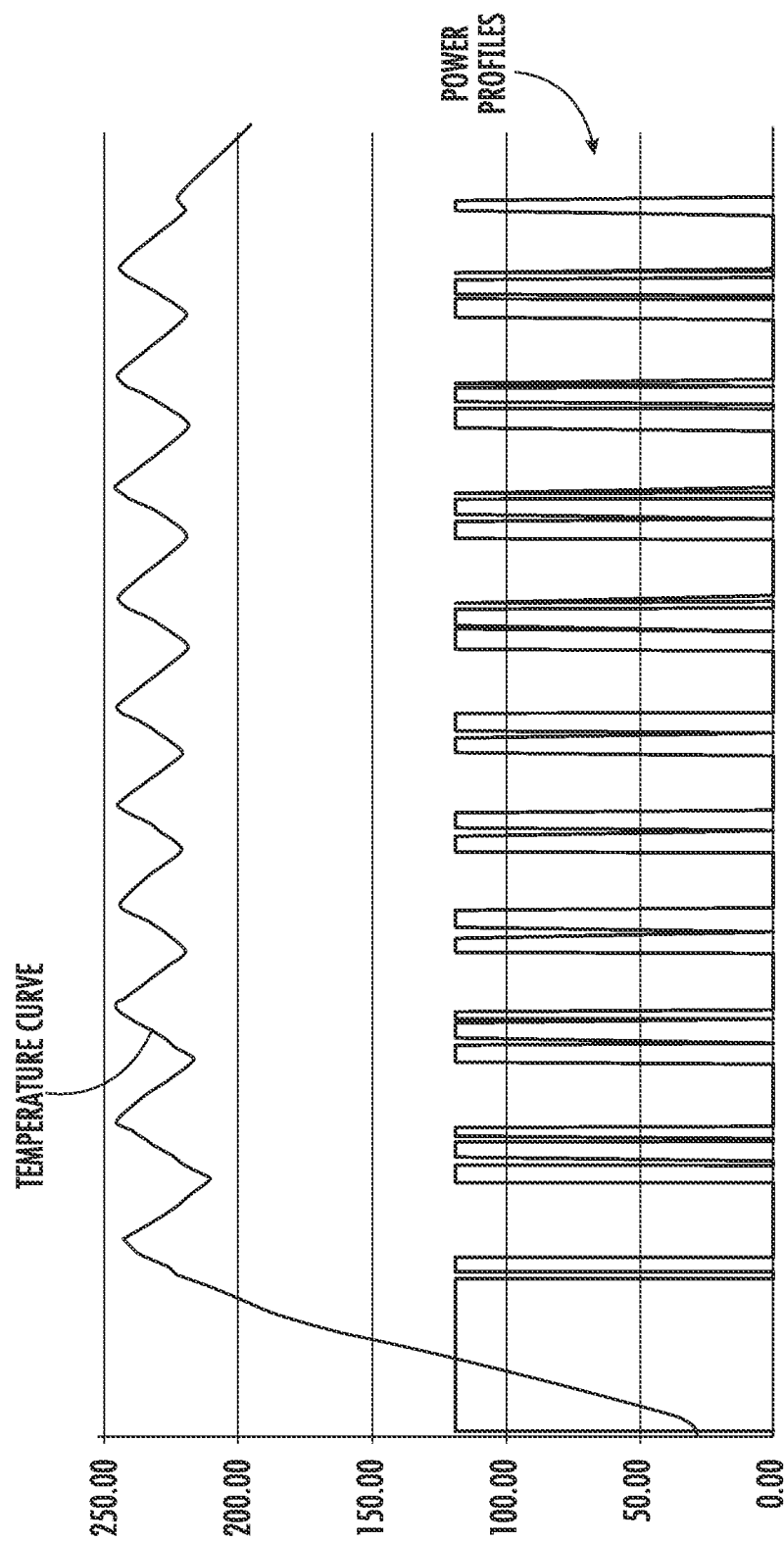
FIG. 17 is a graph showing a temperature curve and representative power usage for another prior art cooking appliance.

As to FIG. 17, heating at 100% power until reaching the target temperature (250° F.) is illustrated by the steeply sloped temperature line. Again, when the target temperature is reached, all heaters are turned off and the appliance cooking chamber is permitted to cool naturally. Heating is then reinstated at 100% power, and the cycle is repeated for the cooking duration. The result, as illustrated, is very large 30+° F. fluctuations. This is also an undesirable temperature profile in cooking.

Figure 18:
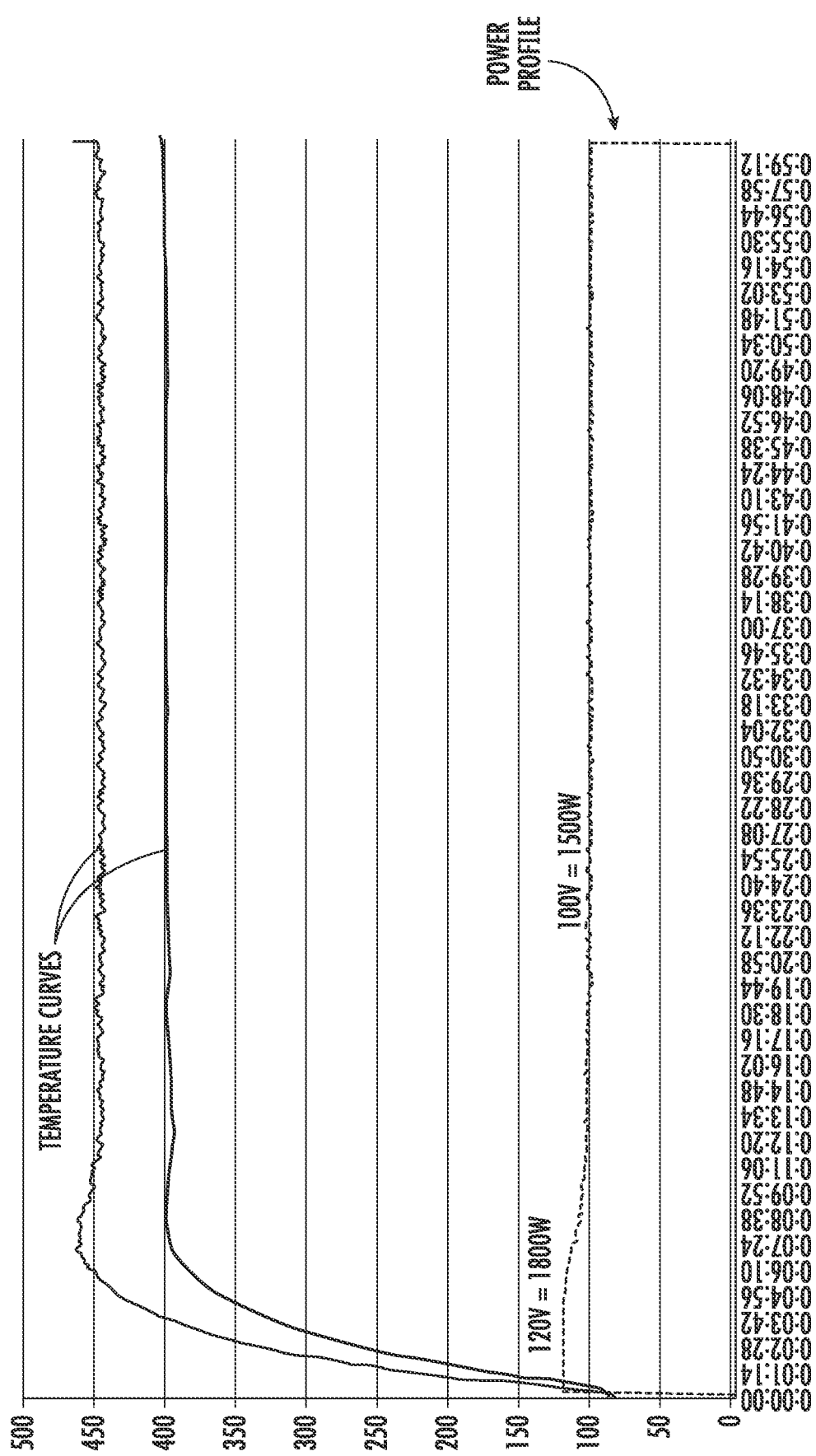
FIG. 18 is a graph showing a temperature curve and representative power usage for an embodiment of the disclosed cooking appliance.

In the present cooking appliance 10, with reference to FIG. 18, the power of the three heating sources 30 is varied from moment to moment to find a suitable power for maintaining the target temperature (450° F.). The two temperature lines include an NTC temperature line (top) and a cooking chamber temperature line (bottom). Once the target temperature is achieved, heating continues at the determined suitable power, thereby avoiding large temperature fluctuations in the cooking chamber 14. This consistent, smooth temperature profile is desirable for a cooking appliance.

The three heating sources 30 of the cooking appliance 10 can be controlled simultaneously to distribute power, and thereby heat, where it is most effective. The controller IC 70, via the control panel 26 allows a user to individually change the power to each of the three heating sources 30. The controller IC 70 distributes power to each of the heating sources during use such that where $X_1$ is power to the first heating source 30A, $X_2$ is power to the second heating source 30B, and $X_3$ is power to the third heating source 30C, and $X_1$, $X_2$, and $X_3$ are percentages of the total power (1700 W), the control panel 26 can be used to set values for $X_1$, $X_2$, and $X_3$, then $X_1+X_2+X_3 \leq 100\%$.

However, preprogrammed cooking operations have a specific heating scheme and power distribution, as shown in the TABLE below. For example, the preprogrammed operation for "Roast" alternates from directing 100% power (1700 W) to the rear heating source 30C, to directing 100% power to be split between the top heating source 30A (at 50% or 850 W) and the bottom heating source 30B (at 50% or 850 W).

TABLE 2

| Menu | Heater Status | Power | Fan Status |
|---|---|---|---|
| 1) Roast | a. Rear: 1700 W<br>b. Top: 850 W +<br>Bottom: 850 W<br>-alternate a & b- | 100% | on |
| 2) Air Roast | a. Rear: 1700 W<br>b. Top: 850 W +<br>Bottom: 850 W<br>-alternate a & b- | 100% | on |
| 3) Air Fry | a. Rear: 1700 W<br>b. Top: 850 W +<br>Bottom: 850 W<br>-alternate a & b- | 100% | on |
| 4) Bake | Rear: 1700 W | 100% | on |
| 5) Dehydrate | Rear: 117-550 W | 7%-33% | on |
| 6) Broil | Top: 1700 W | 100% | off |
| 7) Toast | Top: 760 W<br>Bottom: 940 W | Top: 45%<br>Bottom: 55% | off |
| 8) Bagel | Top: 660 W<br>Bottom: 1040 W | Top: 40%<br>Bottom: 60% | off |
| 9) Pizza | a. Rear: 1700 W<br>b. Rear: 1215 W +<br>Bottom: 485 W<br>-alternate a & b- | 100% | on |
| 10) Reheat | Top: 850 W<br>Bottom: 850 W | Top: 50%<br>Bottom: 50% | off |

As a key feature of the cooking appliance 10, users are able to change the default setting of the "Automatic Preheat Function" on the control panel 26. The default for the cooking appliance 10 is to automatically preheat to a desired temperature before starting a cooking cycle. As with many prior art units, the preheat function can be cancelled by pressing the [Preheat] button on the control panel 26. However, this would require a user to remember to cancel the preheat function every time. Cooking appliance 10 allows the automatic preheat function to be turned off by pressing [Menu] and [Preheat] simultaneously.

The cooking appliance 10 also includes default heating sources 30 based on temperature settings. Beginning with the preheat function, the appliance 10 defaults to top heating source 30A and bottom heating source 30B at 50% power each (850 W). The default power and heating source 30 scheme for each of five preprogrammed temperature ranges is as follows:

a. 50° F.~275° F.: 00:00~99.59 (0-minutes to 99-hrs; 59-minutes.) Default is top & bottom heater work 50% each, top+bottom=100%. Default rear heater is off, 0%.

b. 280° F.~350° F.: 00:00~24:00 (0-minutes to 24-hrs.) Default is top & bottom heater work 50% each, top+bottom=100%. Default rear heater is off, 0%.

c. 355° F.~400° F.: 00:00~04:00 (0-minutes to 4-hrs.) Default is top & bottom heater work 50% each, top+bottom=100%. Default rear heater is off, 0%.

d. 405° F.~450° F.: 00:00~01:00 (0-minutes to 1-hr.) Default is top & bottom heater work 50% each, top+bottom=100%. Default rear heater is off, 0%.

e. 455° F.~500° F.: 00:00~00:30 (0-minutes to 30-min.) Default is top & bottom heater work 50% each, top+bottom=100%. Default rear heater is off, 0%.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A countertop cooking appliance comprising:

a housing having an opening through which food items are inserted into a cooking chamber, a door for covering the opening and movable between an open and closed position, a display, and a control panel with a user interface for inputting cooking parameters;

a first heating source within the housing and positioned above a cooking area within the cooking chamber;

a second heating source within the housing and positioned below the cooking area in the cooking chamber;

a third heating source within the housing and positioned opposite the door within the cooking chamber;

a first fan positioned proximate the first heating source so as to circulate heat generated by the first heating source within the cooking chamber;

a second fan positioned proximate the second heating source so as to circulate heat generated by the second heating source within the cooking chamber;

a third fan positioned proximate the third heating source so as to circulate heat generated by the third heating source within the cooking chamber; and a controller for distributing power to each of the heating sources, wherein the controller is electronically coupled to the control panel and the power distributed to each of the heating sources during use is $X_1$ for the first heating source, $X_2$ for the second heating source, and $X_3$ for the third heating source, wherein $X_1$, $X_2$, and $X_3$ are percentages, the user interface is used to set values for $X_1$, $X_2$, and $X_3$, and $X_1+X_2+X_3 \leq 100\%$.

2. The countertop cooking appliance of claim 1, wherein the first, second and third fans are each independently operated by the controller.

3. The countertop cooking appliance of claim 1, further comprising an outlet within the cooking chamber and a removable grill plate having an electrical connector, wherein the removable grill plate electronically connects to the controller when the electrical connector is coupled to the outlet in the cooking chamber.

4. The countertop cooking appliance of claim 3, wherein connection of the removable grill plate causes the controller to deactivate the second and third heating sources.

5. The countertop cooking appliance of claim 4, wherein the controller distributes power to the grill plate and the power distributed to the grill plate during use is $X_4$, and $X_4$ is a percentage wherein, $X_1+X_4 \leq 100\%$.

6. The countertop cooking appliance of claim 4, wherein the user interface is used to set a value for $X_4$.

7. A countertop cooking appliance comprising:
- a housing having an opening through which food items are inserted into a cooking chamber, a door for covering the opening and movable between an open and closed position, a display, and a control panel with a user interface for inputting cooking parameters;
- a first heating source within the housing and positioned above a cooking area within the cooking chamber;
- a second heating source within the housing and positioned below the cooking area in the cooking chamber;
- a third heating source within the housing and positioned opposite the door within the cooking chamber;
- a controller for distributing power to each of the heating sources, wherein the controller is electronically coupled to the control panel and the power distributed to each of the heating sources during use is $X_1$ for the first heating source, $X_2$ for the second heating source, and $X_3$ for the third heating source, wherein $X_1$, $X_2$, and $X_3$ are percentages, the user interface is used to set values for $X_1$, $X_2$, and $X_3$, and $X_1+X_2+X_3 \leq 100\%$; and
- a removable grill plate having an electrical connector, wherein the removable grill plate electronically connects to the controller when the electrical connector is coupled to an electrical outlet in the cooking chamber, wherein connection of the removable grill plate causes the controller to deactivate the second and third heating sources.

8. The countertop cooking appliance of claim 7, wherein the controller distributes power to the grill plate and the power distributed to the grill plate during use is $X_4$, and $X_4$ is a percentage wherein, $X_1+X_4 \leq 100\%$.

9. The countertop cooking appliance of claim 8, wherein the user interface is used to set a value for $X_4$.

* * * * *